3,000,982
PREPARATION OF CAROTENOID COMPOUNDS
Joseph Donald Surmatis, West Caldwell, N.J., assignor to Hoffmann-La Roche Inc., Nutley, N.J., a corporation of New Jersey
No Drawing. Original application Oct. 24, 1958, Ser. No. 769,323, now Patent No. 2,945,888, dated July 19, 1960. Divided and this application Dec. 1, 1959, Ser. No. 856,491
5 Claims. (Cl. 260—666)

This invention relates to novel chemical processes and to novel chemical compounds useful as intermediates therein. More particularly, the invention relates to novel processes of synthesizing carotenoid compounds, and to novel di(phosphonium halide) compounds and novel diphosphine compounds by means of which said processes can be effected.

This application is a division of my copending application Serial No. 769,323, filed October 24, 1958 now U.S. Patent 2,945,888, issued July 19, 1960.

A general and comprehensive survey of the invention is afforded by the following flow sheet:

FLOW SHEET

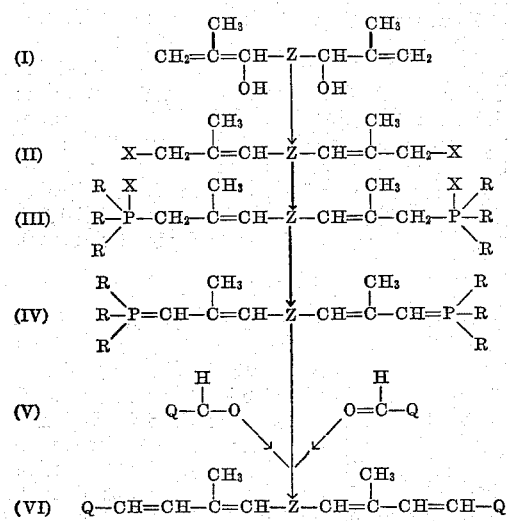

In the preceding flow sheet,

The symbol Z represents a divalent radical selected from the group consisting of the radical —CH=CH— and the radical —C≡C—;

The symbol X represents a halogen, e.g. chlorine or bromine;

The symbol R represents a monovalent aryl radical, e.g. phenyl, naphthyl, p-methoxyphenyl; preferably a monovalent mononuclear aryl hydrocarbon radical, e.g. phenyl or tolyl;

The symbol Q represents a monovalent radical containing a plurality of olefinic bonds; preferably, a monovalent higher hydrocarbon radical containing a plurality of olefinic bonds; still more preferably, a monovalent higher aliphatic or cycloaliphatic-aliphatic hydrocarbon radical containing a plurality of olefinic bonds, at least some of which are in conjugation.

It will be seen from the flow sheet that the comprehensive general process referred to above comprises converting the $C_{10}$ diol represented by general Formula I to the corresponding $C_{10}$ dihalide represented by general Formula II, e.g. by reaction with a concentrated aqueous hydrohalic acid; reacting the $C_{10}$ dihalide with a triarylphosphine of the general formula $R_3P$ (wherein the symbol R has the meaning indicated above), thereby forming a novel di(phosphonium halide) compound represented by general Formula III; dehydrohalogenating the latter, e.g. by treating it with phenyl lithium, methyl lithium, Grignard reagents, or similar organo metal compounds, thereby forming a novel diphosphine compound represented by the general Formula IV; and reacting the latter with approximately two molar proportions of a polyene aldehyde represented by the general Formula V, thereby forming an intermediate compound (not shown by formula in the flow sheet) which spontaneously decomposes to yield the carotenoid compound represented by the general Formula VI. In the event that the radical "Z" in the carotenoid Compound VI is the radical —C≡C—, said carotenoid Compound VI can optionally be subjected to a process of selective hydrogenation, according to methods known per se (e.g. partial hydrogenation with elemental hydrogen in the presence of a selective hydrogenation catalyst, such as palladium-lead) thereby converting the radical —C≡C— to the radical —CH=CH—.

It will be apparent that a characteristic novel step in processes according to the invention is that improved step which comprises condensing a diphosphine compound represented by the general Formula IV above with a polyene aldehyde represented by the general Formula V above. A preferred embodiment of this novel step comprises condensing a diphosphine compound selected from the group consisting of 2,7-dimethyl-2,6-octadien-4-yne-1,8-di(-ylidene triphenylphosphine) and 2,7-dimethyl-2,4,6-octatriene-1,8,di(-ylidene triphenylphosphine) with approximately two molar proportions of a polyene aldehyde represented by the general formula (VII) 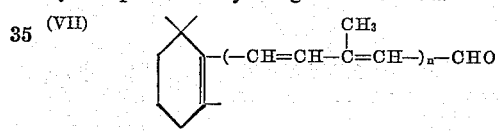

wherein the symbol n represents a small integer, preferably 1 or 2.

It will thus be seen that one preferred specific embodiment of the invention resides in a process which comprises condensing 2,7-dimethyl-2,6-octadien-4-yne-1,8-di(-ylidene triphenylphosphine) with approximately two molar proportions of 5-(2,6,6-trimethyl-1-cyclohexen-1-yl)-3-methyl-2,4-pentadien-1-al, thereby forming dehydro-β-carotene.

Another preferred specific embodiment of the invention resides in a process which comprises condensing 2,7-dimethyl-2,4,6-octatriene-1,8-di(-ylidene triphenylphosphine) with approximately two molar proportions of 5-(2,6,6-trimethyl-1-cyclohexen-1-yl)-3-methyl-2,4-pentadien-1-al, thereby forming β-carotene.

Still another preferred specific embodiment of the invention relates to a process which comprises condensing 2,7-dimethyl-2,4,6-octatriene-1,8-di(-ylidene triphenylphosphine) with approximately two molar proportions of 9-(2,6,6-trimethyl-1-cyclohexen-1-yl)-3,7-dimethyl-2,4,6,8-nonatetraen-1-al, thereby forming decapreno-β-carotene.

Similarly, by condensing 2,7-dimethyl-2,4,6-octatriene-1,8-di(-ylidene triphenylphosphine) with approximately two molar proportions of 3,7,11-trimethyl-2,4,6,10-dodecatetraen-1-al, the carotenoid compound lycopene is produced. Likewise, by condensing 2,7-dimethyl-2,4,6-octatriene-1,8-di(-ylidene triphenylphosphine) with approximately two molar proportions of 3,7,11-trimethyl-2,6,10-dodecatrien-1-al (farnesal), the carotenoid compound tetrahydrolycopene is produced, having the formula:

(VIII)

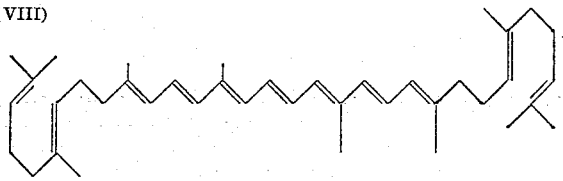

Another characteristic novel step taught by the present invention is the preparation of the novel di(triarylphosphonium halides) of general Formula III shown in the above flow sheet. A preferred method of effecting the preparation of these compounds comprises treating the corresponding halides, general Formula II in the flow sheet, especially the chlorides or bromides, with triphenylphosphine or tri(p-tolyl)phosphine in the presence of a condensation catalyst, such as iodine. Preferred products produced by this aspect of the invention are those in which all aryl radicals present are monovalent mononuclear aryl hydrocarbon radicals, such as phenyl or tolyl, particularly phenyl. It follows that certain preferred embodiments of the novel di(triarylphosphonium halide) products of the invention are represented by the general formula (IX)

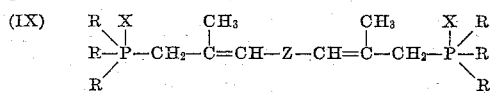

wherein the symbol Z represents a divalent radical selected from the group consisting of —CH=CH— and —C≡C—, the symbol X represents a halogen selected from the group consisting of chlorine and bromine, and the symbol R represents a radical selected from the group consisting of phenyl and tolyl.

The invention is further disclosed in the following examples, which are illustrative but not limitative thereof. Temperatures are stated in degrees centigrade, uncorrected.

*Example 1*

166 g. (1.0 mol) of 2,7-dimethyl-1,7-octadien-4-yne-3,6-diol (Deemer et al., J. Am. Chem. Soc., 70, 154 [1948]) was suspended in 150 ml. of ethyl alcohol and was cooled to minus 10°. Then 1200 ml. of concentrated (48%) hydrobromic acid was placed in a dropping funnel and added in 30 minutes while stirring. The temperature of the reaction mixture was kept at 0° to minus 10° during the addition. Stirring was continued for an additional 15 minutes. The light tan colored crystalline dibromide which formed was filtered by suction in a nitrogen atmosphere and washed on the filter, first with dilute sodium bicarbonate solution and then with water. The solid was dried in vacuum at 40°. The product obtained, 2,7-dimethyl-2,6-octadien-4-yn-1,8-ylene-dibromide (which can also be identified, alternatively, by the nomenclature 1,8-dibromo-2,7-dimethyl-2,6-octadien-4-yne), was used for the next step without further purification.

A solution of 838 g. (3.2 mols) of triphenylphosphine in 3 liters of benzene was heated to 40°. While stirring and maintaining the temperature at 40–45°, a solution of 458 g. (1.57 mols) if 2,7-dimethyl-2,6-octadien-4-yn-1,8-ylene dibromide, dissolved in 500 ml. of benzene, to which solution had been added 0.2 g. of iodine, was dropped into the warm triphenylphosphine solution over a period of two hours. Some crystalline solid began to form soon after the addition was started. After all the dibromide had been added, stirring of the reaction mixture was continued for an additional period of about four hours, and then the reaction mixture was allowed to stand overnight. The white crystalline precipitate was then filtered off, washed with warm benzene and with petroleum ether, in turn, and dried under vacuum. There was thus obtained 2,7-dimethyl-2,6-octadien-4-yn-1,8 - ylene - di(triphenylphosphonium bromide), having M.P. of 223–227°. For analysis, a small portion of the material was recrystallized from methanol-ethyl acetate. The material then melted at 238°.

*Analysis.*—Calc'd for $C_{46}H_{42}Br_2P$: C, 67.65%; H, 5.18%. Found: C, 67.58%; H, 5.31%.

To 21.9 g. (0.26 mol) of phenyl lithium in 500 ml. of ether was added 100 g. (0.12 mol) of the solid, powdered 2,7-dimethyl-2,6-octadien-4-yn-1,8-ylene-di(triphenylphosphonium bromide) over a period of about 30 minutes. The ether refluxed during addition and the color of the reaction mixture turned to a dark brown, resulting in the formation of 2,7-dimethyl-2,6-octadien-4-yne-1,8-di(-ylidene triphenylphosphine).

After all of the phenyl lithium had been thus reacted, there was added to the reaction mixture, dropwise, over a period of about an hour, a solution of 48 g. (0.22 mol) of 5-(2,6,6-trimethyl-1-cyclohexen-1-yl)-3-methyl-2,4-pentadien-1-al (Kuhn et al., U.S.P. 2,239,491), dissolved in 100 ml. of ether. The reaction mixture refluxed vigorously during the addition of the aldehyde and the color turned to a dark red. The mixture was stirred at reflux temperature for four hours in a nitrogen atmosphere. The contents of the flask were cooled to 0° and 200 ml. of methanol was added. The reaction mixture was concentrated to approximately one-third its volume by distilling off solvent under vacuum. The residual mixture was stirred for three hours at minus 10°. The crystalline precipitate was filtered off by suction and washed on the filter with a little methanol and was then recrystallized from ethyl acetate. An additional quantity of product was obtained by concentrating all the mother liquors to a syrup, washing several times with methanol, dissolving the remaining residue in ethyl acetate, and cooling the ethyl acetate solution overnight at minus 10°, thus precipitating a second crop of product which was filtered off and recrystallized from ethyl acetate. The two crops of product were combined, and identified to be 1,18-di(2,6,6-trimethyl-1-cyclohexen-1-yl) - 3,7,12,16-tetramethyl-1,3,5,7,11,13,15,17-octadecaoctaen-9-yne (dehydro-β-carotene), M.P. 154°.

*Example 2*

To a solution of 83 g. (0.5 mol) of 2,7-dimethyl-1,7-octadien-4-yne-3,6-diol in 500 ml. of toluene were added 5 ml. of quinoline and 10 g. of palladium-lead on calcium carbonate catalyst [Lindlar, Helvetica Chimica Acta, 35, 450 (1952)]. Hydrogen gas was passed into the flask at a pressure of 2–3 p.s.i. gauge. When the theoretical quantity of hydrogen had been taken up, the hydrogenation was interrupted and the reaction mixture was filtered. The separated catalyst was slurried twice, each time with 100 ml. of warm acetone, and the acetone was added to the toluene filtrate. The mixture thus obtained was distilled to dryness under vacuum. The crystalline residue was dissolved in warm petroleum ether, and the solution was chilled. There was thus obtained 2,7-dimethyl-1,4,7-octatriene-3,6-diol, M.P. 69–70°.

A solution of 36.6 g. (0.2 mol) of 2,7-dimethyl-1,4,7-octatriene-3,6-diol in 100 ml. of ethanol was cooled to minus 10°. Then 250 ml. of concentrated (48%) hydrobromic acid was added dropwise. After all the hydrobromic acid had been added, the reaction mixture was stirred at 0° to minus 10° for an additional period of approximately 15 minutes. The crystalline product was filtered off by suction in a nitrogen atmosphere. The solid material so recovered was washed with 5% sodium bicarbonate solution and dried under vacuum at 35°. There was thus obtained 2,7-dimethyl-2,4,6-octatrien-1,8-ylene dibromide (alternative nomenclature: 1,8-dibromo-2,7-dimethyl-2,4,6-octatriene), M.P. 70–71°.

To a solution of 131 g. (0.5 mol) of triphenylphosphine in 400 ml. of benzene was added dropwise over a period of four hours, while stirring, and at 40–45°, a solution of 53 g. (0.18 mol) of 2,7-dimethyl-2,4,6-octatrien-1,8-ylene dibromide in 400 ml. of benzene to which 0.1 g. of iodine had previously been added. Crystals began to form as soon as the addition of the dibromide was started. The reaction mixture was stirred at 40–45° for four hours and then was allowed to stand overnight. The next day the precipitated material was filtered off, washed on the filter with benzene and then with petroleum ether, and dried under vacuum at 50°. There was thus obtained 2,7-dimethyl-2,4,6-octatrien-1,8-ylene di(triphenylphosphonium bromide). An analytical sample, recrystallized from methanol-ethyl acetate, melted at 250°.

Analysis.—Cal'd for $C_{46}H_{44}Br_2P$: C, 67.20%; H, 5.56%. Found: C, 67.49%; H, 5.42%.

To 9.25 g. (0.11 mol) of phenyl lithium in 150 ml. of ether was added 46 g. (0.056 mol) of solid 2,7-dimethyl-2,4,6-octatrien-1,8-ylene di(triphenylphosphonium bromide) as a powder, over a period of 30 minutes. The reaction mixture turned a deep purple-red while the temperature rose to about 30°. The reaction mixture was stirred for one hour to complete the dehydrobromination, thereby forming 2,7-dimethyl-2,4,6-octatrien-1,8-ylene di(-ylidene-triphenylphosphine).

To the thus obtained reaction mixture containing 2,7-dimethyl-2,4,6-octatrien-1,8-ylene di(-ylidene - triphenylphosphine) was added dropwise, over a period of one hour, a solution of 24 g. (0.11 mol) of 5-(2,6,6-trimethyl-1-cyclohexen-1-yl)-3-methyl-2,4-pentadien-1-al (Kuhn et al., U.S. Patent 2,239,491) in 50 ml. of ether. During addition of the aldehyde, the reaction mixture began to reflux and turn to a deep red color. After all the aldehyde had been added, the warm reaction mixture was stirred for four hours in a nitrogen atmosphere. The reaction mixture was then cooled to minus 20° and 200 ml. of methanol was added. The thus obtained mixture was cooled to minus 20° for four hours, and then a violet colored precipitate was filtered off, washed with water, ethanol and finally with petroleum ether, and dried in vacuum. There was thus obtained all-trans-β-carotene, M.P. 174–176°, which in a mixed melting point determination with an authentic sample of all-trans-β-carotene showed no lowering of the melting point. After recrystallization from benzene-methanol, the all-trans-β-carotene product had a melting point of 182°.

*Example 3*

To a solution of 8.4 g. (0.1 mol) of phenyl lithium in 150 ml. of ether was added over a period of about 30 minutes, while stirring, 42.6 g. (0.052 mol) of solid 2,7-dimethyl-2,4,6-octatrien-1,8-ylene di(triphenylphosphonium bromide) in powdered form. The reaction mixture was stirred for a further period of one hour to complete the dehydrobromination, resulting in the formation of 2,7-dimethyl - 2,4,6 - octatriene - 1,8 - di(-ylidene - triphenylphosphine).

To the reaction mixture thus obtained, was added, over a period of one hour, while stirring, a solution of 28.4 g. (0.1 mol) of 9-(2,6,6-trimethyl-1-cyclohexen-1-yl)-3,7-dimethyl-2,4,6,8-nonatetraen-1-al (vitamin A aldehyde) in 100 ml. of ether; resulting in refluxing of the reaction mixture. After completion of addition of aldehyde, stirring was continued at reflux temperature, for an additional period of four hours. The reaction mixture was then cooled to minus 20° and 200 ml. of methanol was added. The resulting mixture was stirred at minus 20° overnight. Then the mixture was filtered, and the product on the filter was washed with a little methanol and then with a little petroleum ether. The washed, dark violet crystals were dried under vacuum. The crude material thus obtained was recrystallized from methylene chloride-methanol, resulting in all-trans-decapreno-β-carotene, i.e. 1,26-di(2,6,6-trimethyl-1-cyclohexen-1-yl)-3,7,11,16,20,24 - hexamethyl - 1,3,5,7,9,11,13,15,17,19,21,23,25-hexacosatridecaene; M.P. 191°.

*Example 4*

To a solution of 16.8 g. (0.2 mol) of phenyl lithium in 300 ml. of ether was added, over a period of 30 minutes, while stirring, 82 g. (0.10 mol) of solid 2,7-dimethyl-2,6-octadien-4-yn-1,8-ylene di(triphenylphosphonium bromide) as a fine powder. The reaction mixture was stirred for one hour, then a solution of 56.8 g. (0.2 mol) of 9-(2,6,6-trimethyl-1-cyclohexen-1-yl) - 3,7-dimethyl-2,4,6,8-nonatetraen-1-al (vitamin A aldehyde) in 200 ml. of ether was added over a period of one hour. Stirring was then continued at reflux temperature for four hours. The reaction mixture was then cooled with an ice bath and 400 ml. of methyl alcohol was added all at once. The reaction mixture was stirred about 30 minutes, then was concentrated to about one-half its original volume by distillation under vacuum. The remaining solution was cooled at minus 20° for four hours and filtered. The dehydrodecapreno-β-carotene, i.e. 1,26-di(2,6,6-trimethyl-1-cyclohexen-1-yl) - 3,7,11,16,20,24 - hexamethyl-1,3,5,7,9,11,15,17,19,21,23,25-hexacosadodecaen-13-yne, which was obtained as a dark red crystalline product, was purified by recrystallization from methylene chloride-methanol. It melted at 189° and had U.V. max. at 481 and 513–514 mμ in petroleum ether.

I claim:

1. In the preparation of carotenoid compounds, the improvement which comprises condensing a polyene aldehyde with a diphosphine compound represented by the general formula

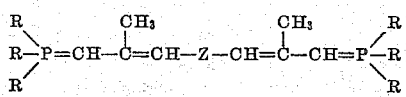

wherein the symbol Z represents a divalent radical selected from the group consisting of —CH=CH— and —C≡C—, and the symbol R represents a monovalent aryl radical.

2. A process of making a carotenoid compound which comprises condensing a diphosphine compound represented by the general formula

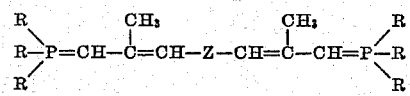

wherein Z represents a divalent radical selected from the group consisting of —CH=CH— and —C≡C—, and R represents a monovalent mononuclear aryl hydrocarbon radical, with approximately two molar proportions of a polyene aldehyde represented by the general formula

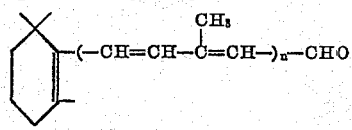

wherein the symbol n represents a small integer.

3. A process of making dehydro-β-carotene which comprises condensing 2,7-dimethyl-2,6-octadien-4-yne-1,8-di(-ylidene triphenylphosphine) with approximately two molar proportions of 5-(2,6,6-trimethyl-1-cyclohexen-1-yl)-3-methyl-2,4-pentadien-1-al.

4. A process of making β-carotene which comprises condensing 2,7-dimethyl - 2,4,6 - octatriene-1,8-di(-ylidene triphenylphosphine) with approximately two molar proportions of 5-(2,6,6-trimethyl - 1 - cyclohexen-1-yl)-3-methyl-2,4-pentadien-1-al.

5. A process of making decapreno-β-carotene which comprises condensing 2,7-dimethyl-2,4,6-octatriene-1,8-di(-ylidene triphenylphosphine) with approximately two molar proportions of 9-(2,6,6-trimethyl-1-cyclohexen-1-yl)-3,7-dimethyl-2,4,6,8-nonatetraen-1-al.

UNITED STATES PATENTS

References Cited in the file of this patent

| | | |
|---|---|---|
| 2,239,491 | Kuhn et al. | Apr. 22, 1941 |
| 2,917,539 | Isler et al. | Dec. 15, 1959 |